(12) United States Patent
Damour et al.

(10) Patent No.: US 6,435,077 B1
(45) Date of Patent: Aug. 20, 2002

(54) PISTON HEAD

(75) Inventors: Philippe Damour, Frankfurt (DE); Carmo Ribeiro, Ann Arbor, MI (US)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 0 days.

(21) Appl. No.: 09/658,075

(22) Filed: Sep. 11, 2000

(30) Foreign Application Priority Data

Sep. 14, 1999 (DE) .......................... 199 43 945

(51) Int. Cl.$^7$ ................................. F16J 1/14
(52) U.S. Cl. ..................................... 92/187
(58) Field of Search .................... 92/186, 187, 188, 92/189

(56) References Cited

U.S. PATENT DOCUMENTS

| | | | |
|---|---|---|---|
| 2,048,002 A | * | 7/1936 | Frelin ........................ 92/186 |
| 3,915,141 A | * | 10/1975 | Ottl et al. ................... 92/186 |
| 4,286,505 A | * | 9/1981 | Amdall ....................... 92/186 |
| 4,876,947 A | * | 10/1989 | Rhodes ....................... 92/187 |
| 5,081,968 A | * | 1/1992 | Bruni ......................... 92/186 |
| 5,144,923 A | * | 9/1992 | Leites et al. ................ 92/186 |
| 5,150,517 A | | 9/1992 | Leites et al. |

FOREIGN PATENT DOCUMENTS

| | | |
|---|---|---|
| AT | 198068 | 6/1958 |
| DE | 3024891 A1 | 2/1982 |
| DE | 3713191 C1 | 7/1988 |
| DE | 38 30 033 C2 | 5/1998 |
| EP | 0 697 513 B1 | 9/1998 |
| GB | 2 199 637 A | 7/1988 |
| WO | PCT/EP96/00145 | 7/1996 |

* cited by examiner

Primary Examiner—F. Daniel Lopez
Assistant Examiner—Igor Kershteyn
(74) Attorney, Agent, or Firm—Reising, Ethington, Barnes, Kisselle, Learman & McCulloch, P.C.

(57) ABSTRACT

The invention relates to a piston head (10) of a piston for an internal combustion engine, in particular for diesel engines, comprising an upper part (12) having a piston crown extending substantially perpendicularly to the longitudinal axis (A) of a piston, and a lower part (14) connected with the upper part (12) and having two pin bosses (26a, b), the mutually facing sides of which are arranged at a mutual distance from one another, the pin bosses (26a, b) each comprising a pin hole (40a, 40b) extending perpendicularly to the longitudinal axis (A) of the piston and in each case aligned with the other and a cavity being formed in the junction area (28a, 28b) of the upper part (12) and the lower part (14), which cavity adjoins the piston crown (16) on the pin boss side and opens into the area between the pin bosses (26a, b). According to the invention, a recess (38a, b) opening into the cavity (32) and extending in the direction of the longitudinal axis (A) of the piston is formed in at least one, preferably in both, of the mutually facing sides (34a, 34b) of the pin bosses (26a, b).

16 Claims, 3 Drawing Sheets

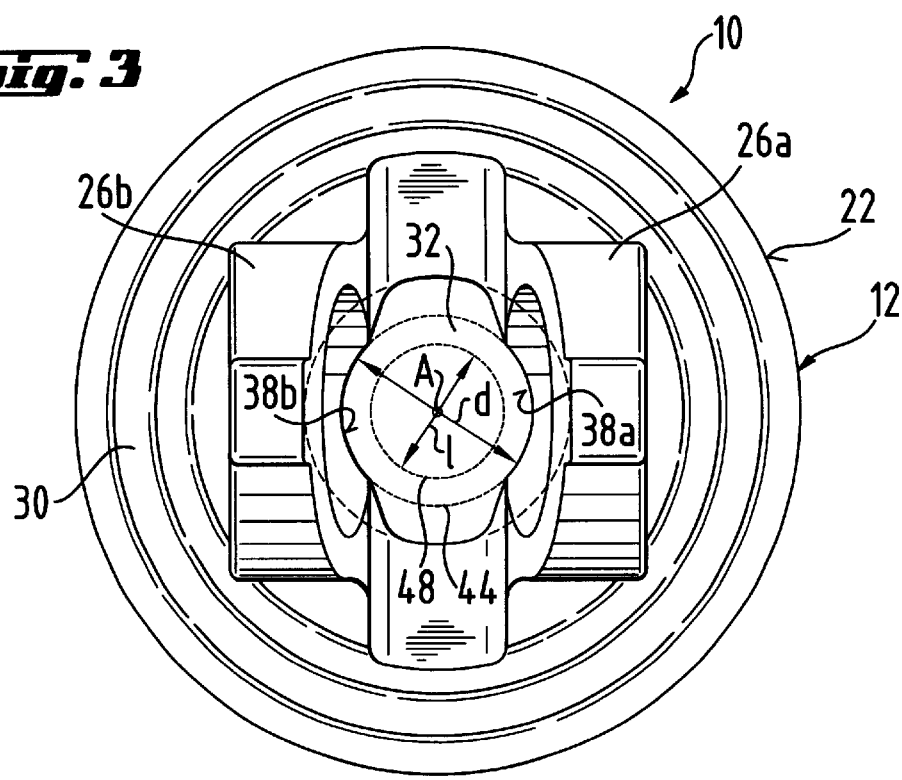
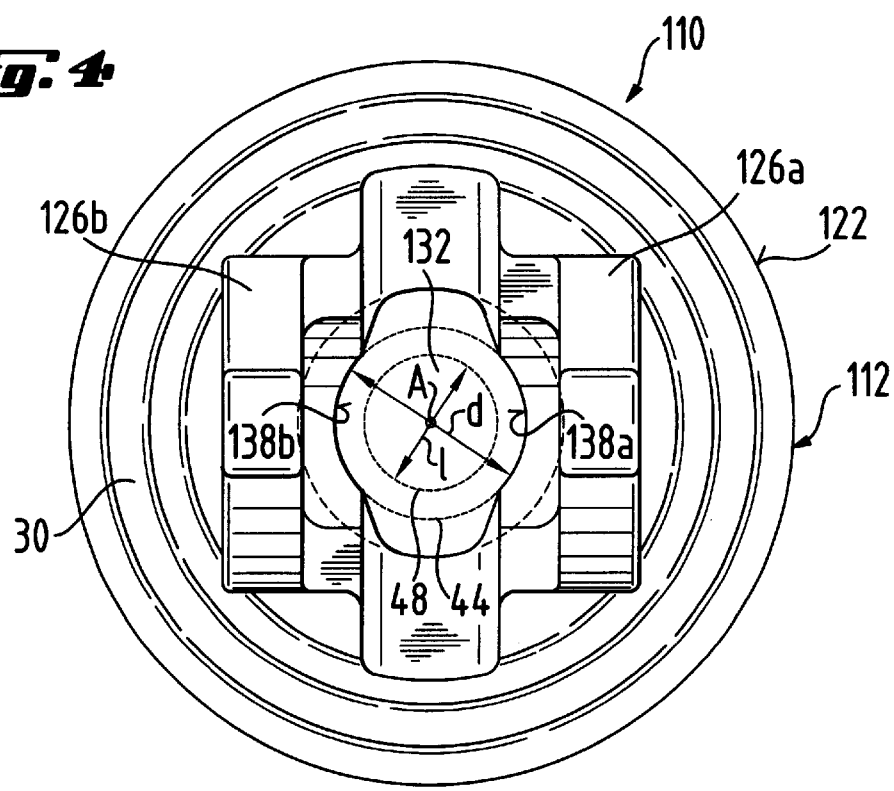

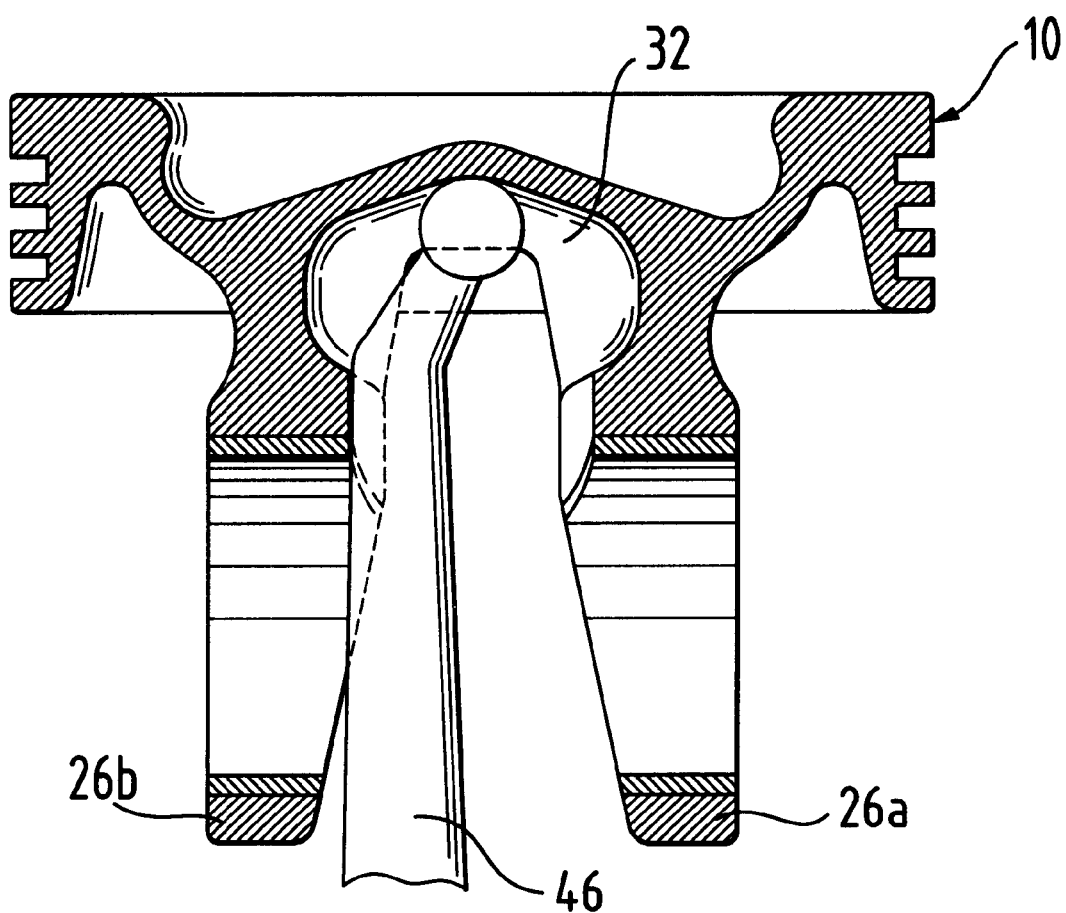

PISTON HEAD

BACKGROUND OF THE INVENTION

The invention relates to a piston head of a piston for an internal combustion engine, in particular for diesel engines, comprising an upper part having a piston crown extending substantially perpendicularly to the longitudinal axis of the piston and a lower part connected with the upper part and having two pin bosses, the mutually facing sides of which are arranged at a mutual distance from one another, wherein the pin bosses each comprise a pin hole extending perpendicularly to the longitudinal axis of the piston and in each case aligned with the other and wherein a cavity is formed in the junction area of the upper part and the lower part, which cavity-adjoins the piston crown on the pin boss side and opens into the area between the pin bosses.

RELATED ART

The piston skirt may be connected articulatedly to this piston head as a separate component via a piston pin (two-piece piston or floating skirt piston). The piston skirt may also be connected rigidly with the piston head as a unit.

A piston of this type is used inter alia as a lightweight piston in high performance engines, for example lorry engines, in which pressures ranging approximately from 180 to 220 bar are exerted on the piston crown during operation by combustion gases generated in the combustion chamber of a cylinder upon combustion. In order to withstand the loads arising, the pistons have to be of an appropriately stable construction. On the other hand, it is desirable, in order to reduce the effective acceleration forces, to reduce as far as possible the mass and thus the inertia of the pistons. To fulfil these conflicting requirements, it was previously proposed to produce pistons which are provided with material recesses in the less mechanically stressed areas thereof, in order thereby to effect a weight reduction. In the past, this was achieved in particular by providing a cavity in the area beneath the piston crown, i.e. on the side of the piston crown remote from the combustion chamber in the case of pistons installed in the cylinder. However, this area beneath the piston crown is not readily accessible during creation of the cavity at the time of piston manufacture owing to the position of the pin bosses, in particular owing to the slight mutual spacing of the pin bosses, which makes it difficult or even impossible for the cavity to exhibit a large size.

This problem is revealed for example by FIG. 1 of WO 96/22459: owing to the narrow space between the pin bosses, the area beneath the piston crown cannot readily be accessed by tools for the purpose of creating the cavity.

To solve the problem of poor accessibility of the area beneath the piston crown during production of a cavity, it is therefore proposed in generic U.S. Pat. No. 5,150,517 to construct the piston head in two pieces. According to this prior art, the upper part and lower part of the piston head are prefabricated from two separate components and then joined together by friction welding to form a piston head blank. To form the cavity, appropriate material recesses are formed in both components during individual machining and the components are then joined together by welding in such a way that the two material recesses together form the cavity positioned beneath the piston crown. The assembled piston blank is subsequently finished. In this way, a piston may indeed be obtained which has a relatively large cavity and low weight, but such a piston manufacturing method, in particular the joining together of the two components, is complex, which makes the production of such pistons time-consuming and cost-intensive.

Other composite pistons are known from EP 0 697 513 A1 and DE 38 30 033 C2. These publications also disclose pistons in which the cavity is formed by joining together two piston components provided with corresponding material recesses. The piston components are connected by means of a plurality of mechanical connecting elements, such as clips and screws for example, which on the one hand increases susceptibility of the piston to failure and on the other hand is again cost-intensive and time-consuming.

As an alternative to a multi-piece piston design, another way of simplifying creation of a large cavity beneath the piston crown considered in the prior art involves enlarging the mutual spacing of the pin bosses. Through this measure, relatively large tools may be introduced into the space between the pin bosses for machining the area lying beneath the piston crown. A relatively large space between the pin bosses has the disadvantage, however, that a pin inserted into the pin holes for mounting a connecting rod has to be correspondingly longer and is thus exposed to a greater bending load, which has a negative effect on the service life thereof and may lead to engine damage, should the pin fail.

SUMMARY OF THE INVENTION

In contrast, the object of the present invention is to provide a piston head of the above-described type which allows the production of a large cavity beneath the piston crown together with simple manufacture and a long service life.

This object is achieved by a piston head of the aforesaid type in which a recess opening into the cavity and extending in the direction of the longitudinal axis of the piston is formed in each case in at least one, preferably in both, of the mutually facing sides of the pin bosses. By providing at least one, preferably two, recesses in the area of the mutually facing sides of the pin bosses, it is possible, despite a small clearance between the pin bosses, to provide additional space for the introduction of a tool into the area beneath the piston crown to produce a relative large cavity beneath the piston crown. It is thus possible to simplify creation of the cavity, while nonetheless keeping the clearance small between the two mutually facing sides of the pin bosses. In this way, the bending load acting on a pin inserted into the pin holes may be kept small. In addition, selecting a small clearance between the pin bosses has the further advantage that the pin provided for mounting the connecting rod has only a small overall length, which in turn leads to a reduction in the mass in motion and thus in the mass moment of inertia.

In order to make the cavity beneath the piston crown as large as possible, provision may be made for the cavity to undercut the mutually facing sides of the pin bosses at least in part in a direction perpendicular to the longitudinal axis of the piston. In this connection, it may be provided that the cavity undercuts the opening of the recess provided in the respective pin boss at least in part in a direction perpendicular to the longitudinal axis of the piston.

The respective recess or the respective recesses in the pin bosses may be defined by part of a cylindrical, preferably circular-cylindrical, circumferential surface, the longitudinal cylinder axis extending in parallel with the longitudinal axis of the piston and preferably coinciding therewith. Production of the respective recess in the pin bosses in the form of part of a circular-cylindrical circumferential surface is unproblematic from the point of view of manufacture, for example it may be produced during forging of the piston head or by means of a drill or cylindrical milling cutter.

With regard to the orientation of the pin bosses relative to one another, provision may be made for the mutual distance between the mutually facing sides of the pin bosses to increase in the direction away from the piston crown, preferably to increase continuously. In the case of such a widening of the space between the pins in the direction away from the piston crown, it may be sufficient, for the purpose of enlarging the access to the area in the vicinity of the piston crown, to provide the recess or the recesses only in the narrowest area of the pin bosses, i.e. in the area of the pin bosses in the vicinity of the upper part, irrespective of whether the distance between the mutually facing sides of the pin bosses increases linearly or non-linearly, i.e. substantially in stages, in the direction away from the piston crown. In the first instance, the pin bosses are trapezoidal. In the event of a non-linear increase in the distance between the pin bosses, on the other hand, the pin bosses are stepped. It should be noted that, where the pin boss spacing is substantially constant in the direction away from the piston crown, the respective recess extends over the entire pin boss height.

In order to ensure reliable, low-play mounting of the connecting rod, i.e. of the connecting rod small end, between the pin bosses in the case of a piston installed in an engine, provision may be made for the mutually facing sides of the pin bosses to comprise mutually opposing bearing faces disposed orthogonally in relation to the pin hole axis (top-guided connecting rod). When the piston is installed, these bearing faces come to bear against corresponding bearing faces of the connecting rod small end and stabilize the swiveling motion of the connecting rod against undesirable tilting out of the swivel plane. Where the space between the pin bosses widens in the direction away from the piston crown, such bearing faces are provided only in the area of the pin bosses in the vicinity of the upper part.

With regard to the arrangement of the respective recess relative to the bearing faces on the pin bosses, provision may be made for the bearing face to be formed in each case of a pair of bearing faces lying a common plane, between which pair the respective recess is provided. By positioning the respective recess in such a way between the bearing faces of the bearing face pair, stable mounting of the connecting rod small end between the pin bosses is still ensured despite the reduction in size of the overall bearing face on each pin boss, which reduction in size arises because the bearing face portion is omitted in the area of the recess, in contrast to a pin boss without the recess according to the invention. In this context, it should also be noted that, owing to the possibility of providing a small distance between the pin bosses, the bending forces acting on the pin mounting the connecting rod small end may be kept slight, such that the pin bends only minimally in the operating state and thus undesirable tilting of the connecting rod out of its swivel plane is minimized.

In order to take account of the above-described operating conditions, i.e. the relatively high operating pressures, provision may be made for the piston head to be made of a high strength material, preferably of steel. However, it is in principle also possible to make the piston head of aluminum material or aluminum alloys if the piston head according to the invention is to be used under lower operating pressures, for example in the region of 150 bar.

The invention further relates to a method of producing a piston head, in particular a piston head of the above-described type, comprising the stages (A) production of a piston head blank, comprising an upper part having a piston crown extending substantially perpendicularly to the longitudinal axis of the piston and additionally comprising a lower part connected with the upper part and having two mutually spaced pin bosses;

(B) formation of a recess in at least one of the mutually facing sides of the pin bosses, in each case in the direction of the longitudinal axis of the piston; and (C) formation of a cavity in the junction area of upper part and lower part by means of a tool passed through between the pin bosses in the area of the recess, of which there is at least one.

Provision may be made according to the invention for stages (A) and (B) to comprise forging processes, resulting in wear-resistant pistons. It may additionally be provided that stage (C) comprises cutting machining, which allows simple, low-cost production of a cavity beneath the piston crown.

THE DRAWINGS

Exemplary embodiments of the invention are described below with reference to the attached drawings, in which:

FIG. 3 is a view from below of a piston head according to the invention with trapezoidal pin bosses;

FIG. 4 is a view from below of a piston head according to the invention corresponding to FIG. 3 but with stepped pin bosses; and FIG. 5 is a sectional view corresponding to FIG. 2 with a schematically illustrated tool inserted into the cavity.

DETAILED DESCRIPTION

Figure 1:
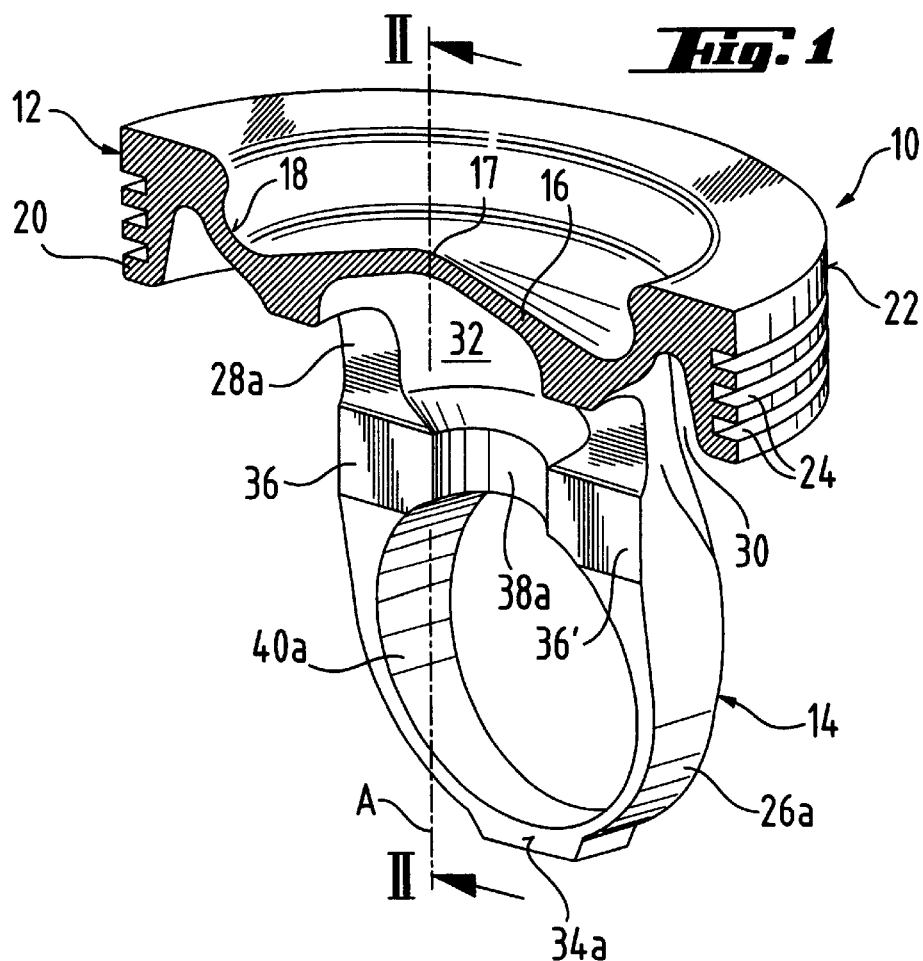
FIG. 1 is a perspective view of a piston head according to the invention, in axial section extending parallel to the pin bosses along plane I—I of FIG. 2.
Figure 2:
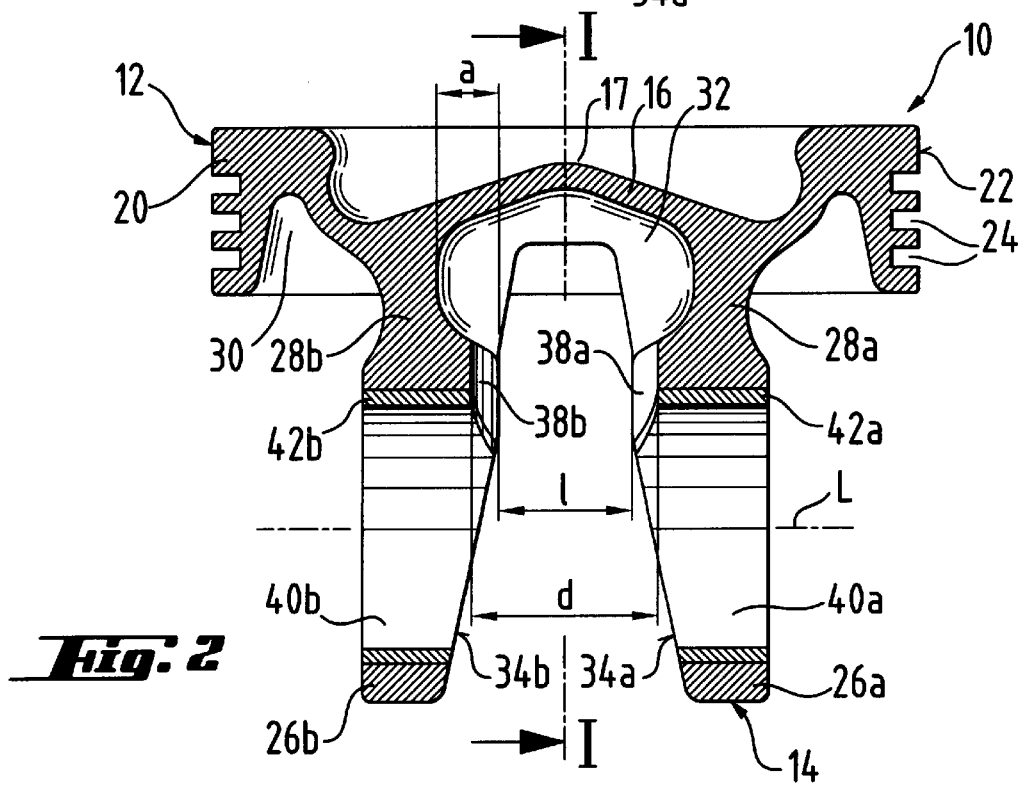
FIG. 2 is an axial section of the piston head of FIG. 1 according to section line II—II.

FIG. 1 shows a piston head according to the invention designated in general by reference numeral 10 and comprising a longitudinal piston axis A, said piston head 10 being shown in axial section (along section plane I—I according to FIG. 2). The piston head 10 comprises an upper part 12 and a lower part 14. The upper part 12 comprises a piston crown 16, which is substantially conical, wherein the tip of the cone 17 points away from the lower part 14 and lies on the longitudinal axis A of the piston. In its radially outer area 18, the piston crown 16 develops in the manner of a dish into a piston edge 20. The radially outer surface 22 of the piston edge 20 serves to accommodate the piston rings when the piston head 10 is installed. Ring grooves 24 are formed in the surface 22 in the circumferential direction about the longitudinal piston axis A, which grooves 24 serve to accommodate piston rings, not shown.

As FIG. 2 also shows, the lower part 14 comprises two pin bosses 26a, 26b. The pin bosses 26a, 26b are each connected to the upper part 12 via a junction area 28a, 28b. In order to save weight, an annular recess 30 is provided between the junction area 28a, 28b and the radially inner area of the piston edge 20, to provide cooling oil for dissipating the heat from the piston rings.

A cavity 32 is provided beneath the piston crown 16, i.e. at the level of the junction area 28a, 28b of the pin bosses 26a, 26b and the upper part 12. The cavity is defined in domed manner by the underside of the piston crown 16 and the junction areas 28a, 28b. As FIG. 2 shows, the cavity 32 forms an undercut, in each case of the dimension a, relative to the mutually facing sides 34a and 34b defining the clearance l between the two pin bosses 26a and 26b.

In the area of the pin bosses 26a, 26b in the vicinity of the piston crown, there is in each case provided a bearing face pair consisting of bearing faces 36 and 36', which lie in a common plane and are oriented parallel to the longitudinal axis A of the piston and parallel to the corresponding opposing bearing faces of the respective other pin boss. Between the bearing faces 36, 36', there are provided mutually opposing recesses 38a, 38b in the pin bosses 26a, 26b. The recesses 38a, 38b are in each case defined as parts of a circumferential surface of a circular cylinder, the cylinder axis coinciding with the longitudinal axis A of the piston. The recesses 38a, 38b in the pin bosses 26a, 26b extend in the direction of the longitudinal axis A of the piston into the cavity 32 in each case in such a way that the maximum distance d between the pin bosses 26a, 26b markedly exceeds the clear width l in the area of the recesses 38a, 38b, such that, in the area of the recesses 38a, 38b, the access to the cavity 32 defined by the distance between the pin bosses 26a, 26b is widened.

As may also be seen from FIGS. 1 and 2, pin holes 40a and 40b are provided in the pin bosses 26a, 26b, which pin holes 40a and 4b are aligned with one another and the longitudinal pin hole axis L of which extends orthogonally to the longitudinal axis A of the piston. The pin holes 40a and 40b serve to accommodate a pin, not shown, which in turn passes through the hole in a connecting rod in the manner of a bearing when the piston head 10 is installed. FIG. 2 also shows bearing bushes 42a, 42b, which ensure that mounting of the pin, not shown, is effected in a manner favorable for wear.

FIG. 2 also shows that the clearance between the pin bosses 26a, 26b increases away from the piston crown 16 in the direction of the longitudinal axis A of the piston, and indeed does so continuously from the lower half of the pin bosses. Pin bosses 26a, 26b formed in this way are also designated trapezoidal pin bosses. Such a widening of the space between the pin bosses 26a and 26b is possible from the point of view of mounting a connecting rod small end between the pin bosses, since the pin, not shown, which is mounted as described above in the pin holes 40a, 40b, and the bearing faces 36, 36' ensure correctly positioned mounting of the connecting rod. The measure comprising widening of the space between the pin bosses 26a, and 26b in the direction away from the piston crown 16 additionally allows piston weight to be saved.

FIG. 3 shows the piston head 10 according to the invention and shown in FIGS. 1 and 2 in a view from below. In this view, the enlargement of the access to the cavity 32 by the recesses 38a and 38b is particularly clear. As described above, the recesses 38a, 38b are defined by a circular-cylindrical circumferential surface 44 shown by broken lines, the longitudinal cylinder axis coinciding with the longitudinal axis A of the piston. This circumferential surface also defines the space available for movement of a tool 46 introduced between the pin bosses 26a, and 26b in the direction of the pin bosses, as shown schematically in FIG. 5. The maximum range of movement 48, shown in dotted lines in FIG. 3, about the longitudinal axis A of the piston in the case of a piston head without the recesses 38a, 38b according to the invention, as is the case for example with conventional pistons described above in relation to the prior art, is, as may be clearly seen in FIG. 3, considerably smaller (l-d) than the range of movement 44 available in this central piston area in the construction according to the invention with the recesses 38a and 38b. The recesses 38a and 38b thus make it possible for the tool 46 to be moved about the axis A in the central piston area further in the direction of the piston edge and thus the cavity 32 may be larger.

The provision of the recesses 38a and 38b additionally leads to a further reduction in the weight of the piston head 10, which additionally reduces the moment of inertia thereof.

As an alternative to FIGS. 1–3 and 5, FIG. 4 shows a second exemplary embodiment of a piston head 110 according to the invention. The piston head 110 comprises substantially the same components as the piston head 10 described above, such that these components are each designated with the same reference numerals, but increased by the number 100. The piston head 110 according to FIG. 4 differs from the above-described piston head 10 only in that the pin bosses 126a, and 126b thereof do not diverge continuously in the direction away from the upper part 112, but rather the portions thereof remote from the piston crown extend parallel to one another.

What is claimed is:

1. A piston head for an internal combustion engine, comprising:

an upper part having a piston crown extending substantially perpendicularly to a longitudinal axis of the piston head, and a lower part formed as one piece with said upper part and having two pin bosses with mutually facing sides spaced a mutual distance from one another across a space defined between said mutually facing sides of said pin bosses, said pin bosses including axially aligned pin holes extending along a pin hole axis perpendicularly to said longitudinal axis, and a cavity formed in a junction area of said upper and lower parts adjacent said piston crown and opening into said space between said pin bosses of said lower part; and wherein said mutually facing sides of said pin bosses are formed with at least one recess opening into said cavity and extending in the direction of said longitudinal axis.

2. The piston head of claim 1 wherein said cavity undercuts and extends laterally beyond said mutually facing sides of said pin bosses at least in part in a direction perpendicular to said longitudinal axis.

3. The piston head of claim 1 wherein said cavity undercuts said at least one opening at least in part in a direction perpendicular to said longitudinal axis.

4. The piston head of claim 1 wherein said at least one recess is defined by part of a cylindrical circumferential surface having a longitudinal cylinder axis extending parallel with said longitudinal axis of said piston.

5. The piston head of claim 4 wherein said longitudinal cylinder axis is coaxial with said longitudinal piston axis.

6. The piston head construction of claim 1 wherein said mutual distance increases in the direction away from said piston crown.

7. The piston head of claim 6 wherein said mutual distance increases continuously in said direction away from said piston crown.

8. The piston head of claim 6 wherein said mutual distance increases substantially linearly in the direction away from said piston crown.

9. The piston head of claim 6 wherein said mutual distance increases substantially in stages in the direction away from said piston crown.

10. The piston head of claim 1 wherein said mutually facing sides comprise mutually opposing bearing faces disposed orthogonally in relation to said pin hole axis.

11. The piston head of claim 10 wherein said bearing faces of each pin boss comprise a pair of co-planar laterally spaced bearing face portions separated by a respective one of said recesses.

12. The piston head of claim 11 wherein each said pair of bearing face portions is provided adjacent said cavity.

13. The piston head of claim 1 wherein said piston head is fabricated of steel.

14. A method of producing a piston head comprising:

A) producing of a piston blank for a piston head having a longitudinal axis, comprising an upper part having a piston crown, and a lower part having two mutually spaced pin bosses with mutually facing sides;

B) forming of a recess in at least one of the mutually facing sides extending in the direction of the longitudinal axis of the piston; and C) forming a cavity in a junction area of upper part and lower part with a tool by introducing the tool through the space between the pin bosses and the at least one recess.

15. The method of claim 14 wherein steps A) and B) are carried out by a forging processes.

16. The method of claim 14 wherein step C), the cavity is machined by the tool.

* * * * *